(12) United States Patent
Barr

(10) Patent No.: US 6,178,066 B1
(45) Date of Patent: Jan. 23, 2001

(54) METHOD OF FABRICATING AN IMPROVED THIN FILM DEVICE HAVING A SMALL ELEMENT WITH WELL DEFINED CORNERS

(75) Inventor: Ronald A. Barr, Mountain View, CA (US)

(73) Assignee: Read-Rite Corporation, Fremont, CA (US)

(*) Notice: Under 35 U.S.C. 154(b), the term of this patent shall be extended for 0 days.

(21) Appl. No.: 09/085,156

(22) Filed: May 27, 1998

(51) Int. Cl.⁷ .................................................. G11B 5/147
(52) U.S. Cl. ............................................................ 360/126
(58) Field of Search .................................. 360/121, 123, 360/125–126

(56) References Cited

U.S. PATENT DOCUMENTS

| | | | |
|---|---|---|---|
| 4,172,758 | 10/1979 | Jones et al. | 156/643 |
| 4,464,459 | 8/1984 | Hajima et al. | 430/313 |
| 4,599,561 | 7/1986 | Takahashi et al. | 324/208 |
| 4,666,554 | 5/1987 | De White et al. | 156/643 |
| 4,841,624 | 6/1989 | Togawa | 29/603 |
| 4,971,896 | 11/1990 | Kawabe | 430/394 |
| 5,221,417 | 6/1993 | Basavanhally | 156/629 |
| 5,227,761 | 7/1993 | Sugimoto et al. | 338/32 R |
| 5,231,275 | 7/1993 | Wakaumi et al. | 235/449 |
| 5,381,291 | 1/1995 | Madden et al. | 360/113 |
| 5,393,376 | 2/1995 | Chen et al. | 156/643 |
| 5,578,342 | 11/1996 | Tran et al. | 427/131 |
| 5,634,260 | 6/1997 | Nix et al. | 29/603.14 |
| 5,637,235 | 6/1997 | Kim et al. | 216/22 |
| 5,640,734 | 6/1997 | Lazzari et al. | 29/603.15 |
| 5,640,753 | 6/1997 | Schultz et al. | 296/603.08 |
| 5,649,351 | 7/1997 | Cole et al. | 29/603.14 |
| 5,653,013 | 8/1997 | Gill et al. | 29/603.15 |

*Primary Examiner*—Allen T. Cao
(74) *Attorney, Agent, or Firm*—Michaelson & Wallace

(57) ABSTRACT

The novel method of fabrication of the present invention allows conventional or other lithography machines to produce very small well defined thin film structures or elements. The present invention provides a method to produce well defined elements, including sensors or read heads well below 0.1 microns, even when using conventional photolithography processes. The presently preferred method for forming the thin film device of the present invention includes depositing and exposing resist so as to define a first thin resist stripe. A portion of the resist is removed leaving a first thin strip covering a portion of the first material layer. The uncovered portion of the first material layer is removed to leave a first material strip. A second resist layer is deposited and exposed so as to define a second thin stripe intersecting the first material strip. A portion of the second resist layer is removed so as to leave a second thin strip of resist covering a portion of the first material strip. The uncovered portion of the first material strip is removed leaving the small thin film element. Typically, the second thin strip of resist is formed perpendicular to the first material strip thereby providing a very small thin film element having planar surfaces with precisely defined squared corners. A feature of the present invention is that it provides a small magneto-resistive read head having a planar sensing surface with abutting planar side walls orthogonal to the sensing surface thereby providing a well defined small sensor element.

48 Claims, 2 Drawing Sheets

METHOD OF FABRICATING AN IMPROVED THIN FILM DEVICE HAVING A SMALL ELEMENT WITH WELL DEFINED CORNERS

BACKGROUND

The present invention relates to the field of storage and retrieval of information on magnetic media.

Presently, information is written to and read from magnetic media using thin film structures having write and read heads. The read head is typically formed of magneto-resistive material. With this type read head, it is very important to control the shape of the features of the head. In particular, the sensing surface of a magneto-resistive read head, which senses the magnetic moment of the magnetic media across an air bearing, must be flat. If there is a curvature of the surface of the read head with respect to the magnetic media, the edges of the read head or sensor will not be able to sense the information on the magnetic media.

To provide a flat or straight edge with respect the magnetic media, the air bearing surface of the thin film head is typically formed by grinding or lapping. There are several problems with this technique. The height of the head is defined by mechanical means, so there may be a problem with accurately controlling the height of the head. The other problem is that lapping into the stripe may degrade device performance by smearing the different layers together. There is also a potential for corrosion of the stripe because of the various slurries used in the lapping process.

Another approach to control head height and to avoid corrosion problems is to define a magneto-resistive strip through lithographic means and then lap up to the strip, but stop short of strip itself, leaving a very thin layer, such as 1.0 microinch or 250 Angstroms of alumina or $Al_2O_3$, ahead of the strip. Such a recessed head structure is disclosed in U.S. patent application Ser. No. 08/541,441, filed on Oct. 10, 1995, entitled HIGH DENSITY GIANT MAGNETORESISTIVE TRANSDUCER WITH RECESSED SENSOR.

This approach has several advantages. A significant advantage is that it decreases the sensitivity of the device to environmental and process induced corrosion and allow the use of less corrosion resistant magnetic materials thereby increasing the range of materials available for use. Also, the dimensions of the read element would no longer be controlled by lapping or grinding. Furthermore, smearing of the read element layers during lapping or grinding would no longer be a problem.

There is, however, a significant process limitation associated with producing a mask defined stripe. Typically some form of conventional photolithography is used to define the structure of the stripe. For very small structures, such as 0.25 microns even advanced step and repeat cameras are near the limit of resolution. Furthermore, the trend to reduce head sizes will surely continue. Aereal density or the ability to read and write data, has been increasing 60% per year for the past 20 years. Aereal density is related to the size of the geometry of head. It is projected by this inventor, that minimum thin film head geometries will pass semiconductor geometries in year 2003 and have sub 0.1 micron structures by the year 2003.

Conventional photolithography, however, does not easily print square images well. Because of optical diffraction effects, the corners of a square shape will tend to print round. Round shapes do not form the necessary straight edge with the air bearing surface. A rounded edge will not perform well because the space between the sensing surface as it arcs away from the air bearing surface diminishes the sensing capability of the head. Extremely sharp corners and straight edges are required for small geometries.

There are several optical techniques designed to square the image, such as optical proximity correction, phase shifting, and off axis illumination. These techniques, however, are not likely to print sharp, straight edges that are needed to define very small structures. Current optical lithography techniques, therefore, ultimately will fail.

There are other techniques, not dependent upon light that may work. E-beam direct write and X-ray lithography may be able to produce the required geometries. The cost of these systems, however, is extremely high, and the technical challenge behind implementing these type systems is also extremely high.

SUMMARY OF THE INVENTION

The novel method of fabrication of the present invention allows (conventional or other lithography machines to produce very small well defined thin film elements or structures. For example, the method of the present invention may be used to form very small sensors or read heads without encountering the above mentioned difficulties or limitations. The present invention provides a method to produce well defined elements, including sensors or read heads well below 0.1 microns, even when using conventional photolithography processes.

The presently preferred method for forming the thin film head of the present invention includes forming a layer of a first material, such as magneto-resistive material, over a substrate or directly on a substrate. Next a first resist layer is deposited over the first layer. The first resist layer is exposed so as to define a first thin stripe. A portion of the resist is removed so as to leave a first thin strip of the first resist layer coverings a portion of the first material layer. The uncovered portion of the first material layer is removed, such as by etching, so as to leave a first material strip.

A second resist layer is then deposited and exposed so as to define a second thin stripe intersecting the first material strip. A portion of the second resist layer is removed so as to leave a second thin strip of resist covering a portion of the first material strip. The uncovered portion of the first material strip is removed so as to leave a small first material element.

The element of the present invention provides at least one planar surface having two opposing side surfaces abutting the planar surface. The abutting side surfaces define the width of the thin film element.

Typically, the second thin strip of resist is formed perpendicular to the first material strip thereby providing a very small thin film element, such as a read or sensor head, having planar surfaces with precisely defined squared corners. A feature of the present invention is that it may be employed to form a magneto-resistive read head having a planar sensing surface with abutting planar side walls orthogonal to the sensing surface. The present invention thereby provides a small sensing element having increased sensitivity.

DETAILED DESCRIPTION

Figure 1:
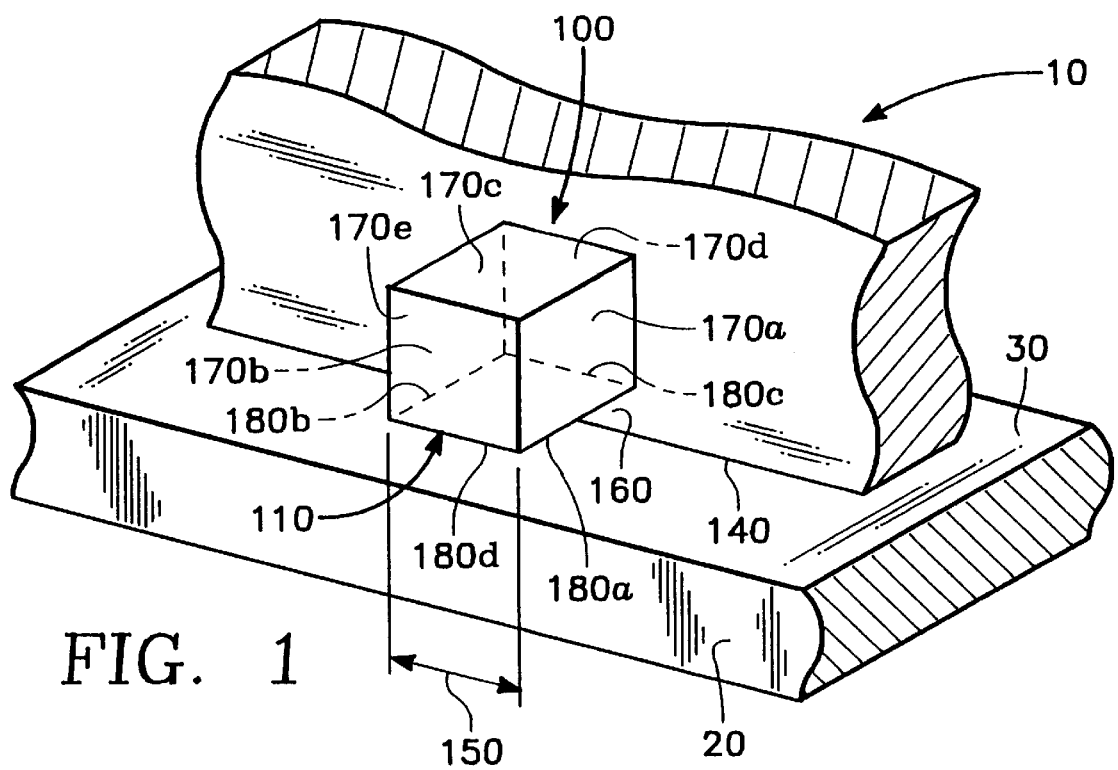
FIG. 1 is an cut-away oblique view of an element, such as a magneto-resistive read element, of the thin film device of the present invention.

The Presently Preferred Embodiment of the Present Invention (FIG. 1)

The present invention is intended to be used to produce any element, such as a read element, a shield element, or other thin film head structure or element with greater precision. Since the structure and size of the read element is particularly important in improving data density, the following description of the present invention will be set forth with respect to a magneto-resistive read head. Nevertheless, the present invention and its teachings, are not limited to a magneto-resistive element but are also intended to be applied to any thin film device structures or elements.

Furthermore, although the present invention as follows is discussed in terms of structures formed by conventional photolithographic processes, it is in no way limited to structures formed by conventional processes, but instead is designed to improve structures formed by other mask or reticle employing techniques as well. As such, the present invention will improve structures formed by processes, such as for example, X-ray lithography, E-beam lithography, or other radiation type lithography.

FIG. 1 depicts an element 100 in a thin film head 10 of the present invention. The element or read element 100 has a planar sensing surface 110 having a width 150. The read element 100 in thin film head 10 senses the magnetic moment of magnetic media 20 across the air bearing 30. It is presently preferred to recess or separate the read element 100 of the present invention is typically recessed or separated by a protection layer 160 from air bearing surface 140.

The read element or sensor 100 of the present invention is not limited to a single layer of magneto-resistive material but rather may be multilayered and may be some other type of transducer or sensor. For example, the read element 100 of the present invention may be a GMR or other transducer or sensor, such as those disclosed in U.S. patent application Ser. No. 08/541,441, filed on Oct. 10, 1995, entitled HIGH DENSITY GIANT MAGNETORESISTIVE TRANSDUCER WITH RECESSED SENSOR, herein incorporated by reference.

By providing the ability to recess the read element 100, environmental and process induced corrosion is eliminated. Therefore, less corrosion resistant materials may be used to form sensor 100, thereby increasing the range of materials available for use. Also, the dimensions may be more precisely controlled because the dimensions of the read element are no longer controlled by lapping, grinding, or other mechanical removal. Furthermore, the read element 100 layers are not smeared during lapping or grinding.

Adjacent the planar sensing surface 110 are planar surfaces 170a and 170b, which define the width 150 of the read element 100. The adjacent planar surfaces 170a and 170b are orthogonal to the sensing surface 110 and form substantially orthogonal or squared corners 180a and 180b. With thin film head structures, it is very desirable to create a sensing surface that has a well defined planar structure. If the sensing surface is curved or rounded, the sensor will not be able to easily sense the information on the magnetic media. As will be discuss further below, the presently preferred embodiment of the present invention employs photolithographic techniques to provide the well defined planar sensing surface 110 having a width 150 of less that 0.25 microns without lapping or grinding into the magneto-resistive material.

The present invention is not limited by the wavelength of light so allows for squared structures below 0.25 microns, below 0.1 microns, below 0.05 microns, below 0.01 microns, and below. It is predicted that the squared structures of the present invention may reach the order of magnitude of atoms even when using visible light photolithographic techniques. Furthermore, the present invention will also improve structures formed by other lithographic techniques which employ other types of radiation.

The embodiment of FIG. 1 also provides substantially planar walls 170c, 170d, and 170f, which form substantially orthogonal corners. Although FIG. 1 depicts read element 100 as having a cubic structure, the read element 100 may have an elongated shape or any other shape which produces a substantially planar sensing surface 110 having orthogonal corners 180a and 180b.

A feature of the present invention is that it allows the magneto-resistive to be recessed from the air bearing surface and for the formation of the protection layer 160. As the present invention allows the forming of the a planar sensing surface 110 with well defined corners or edges 180a, 180b, 180c, and 180d, there is no need to lap or grind into the sensing surface 110. Furthermore, it allows protection layer 160, formed of a dielectric material such as $Al_2O_3$, to be located between the sensing surface 110 and the air bearing surface 140. This allows air bearing surface 140 to be lapped or ground without exposing the sensing surface 110 of the magneto-resistive element. This eliminates corrosion or smearing of the sensing surface 110.

The Presently Preferred Method for Fabricating the Presently Preferred Embodiment (FIGS. 2–8)

The presently preferred method for fabricating the presently preferred embodiment is intended to be used to produce any element, such as a read element, a shield element, or other thin film head structure or element with greater precision. Since the structure and size of the read element is particularly important in improving data density, the following description of the present invention will be set forth using the non-exclusive example of photolithographic techniques to form a magneto-resistive read head element. Nevertheless, the present invention and its teachings, are not limited to photolithography or to magneto-resistive elements but are also intended to be applied to any type of lithography or to thin film structures or elements.

Figure 2:
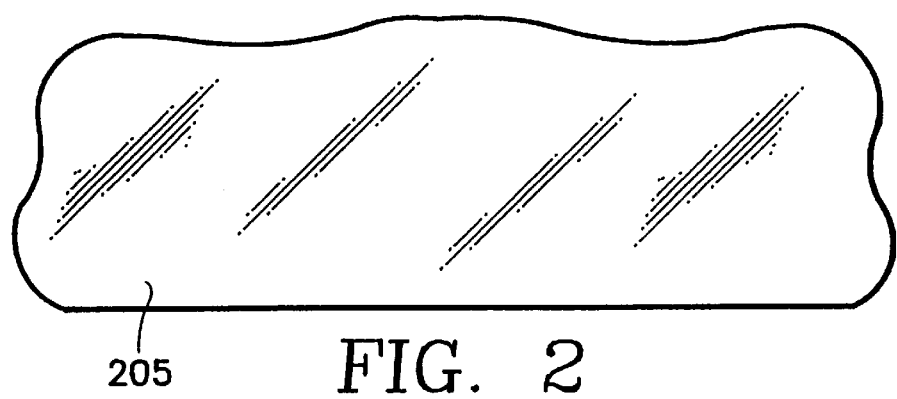
FIG. 2 depicts a first layer, such as a magneto-resistive layer or layers, deposited over a substrate.

FIG. 2 depicts a layer 205 deposited over a substrate. The substrate may be formed of a ceramic, such as Titanium Carbide. The layer 205 may be a single layer of magneto-resistive material or it may be formed of multiple layers, some of which may comprise magneto-resistive material. Furthermore, the layer or layers 205 may be a sensing device such as those disclosed in U.S. patent application Ser. No. 08/541,441, filed on Oct. 10, 1995, entitled HIGH DENSITY GIANT MAGNETORESISTIVE TRANSDUCER WITH RECESSED SENSOR and incorporated by reference. In addition, the layer or layers 205 may be deposited over, or may be deposited directly on, some other substrate or over thin film head structures or thin film layers used to form other thin film structures.

Figure 3:
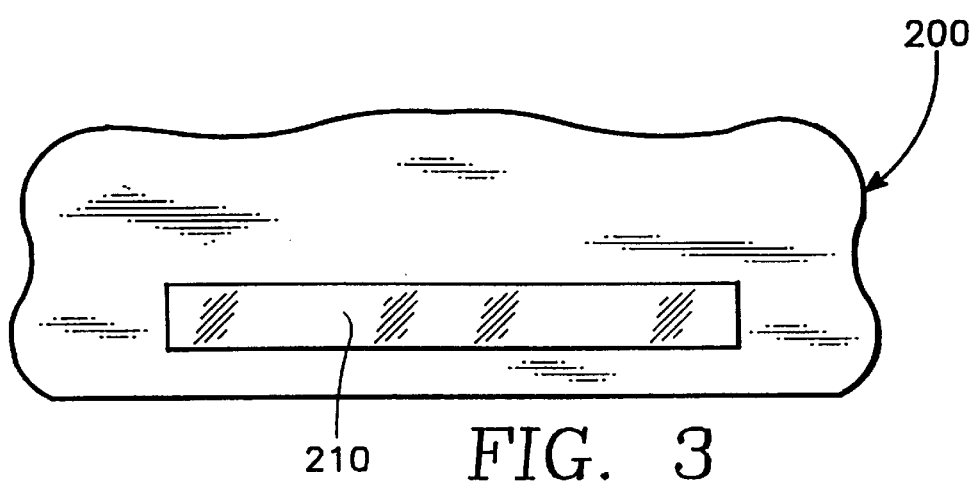
FIG. 3 depicts a thin first layer strip, such as a magneto-resistive strip, formed by selective removal of a portion the magneto-resistive layer after lithographic printing.

Turning to FIG. 3, after the layer or magneto-resistive layer 205 has been deposited on substrate 200, a first photoresist layer, not shown, is deposited on the magneto-resistive layer 205 and exposed using a mask or reticle to define a first thin stripe. The unexposed photoresist is removed so as to uncover a portion of the magneto-resistive material, thereby leaving a first thin strip of photoresist. The uncovered magneto-resistive material is removed, such as by ion milling or by RIE etching or by some other technique, to leave a magneto-resistive strip 210. The strip 210 has planar sidewalls 230 and 240.

Figure 4:
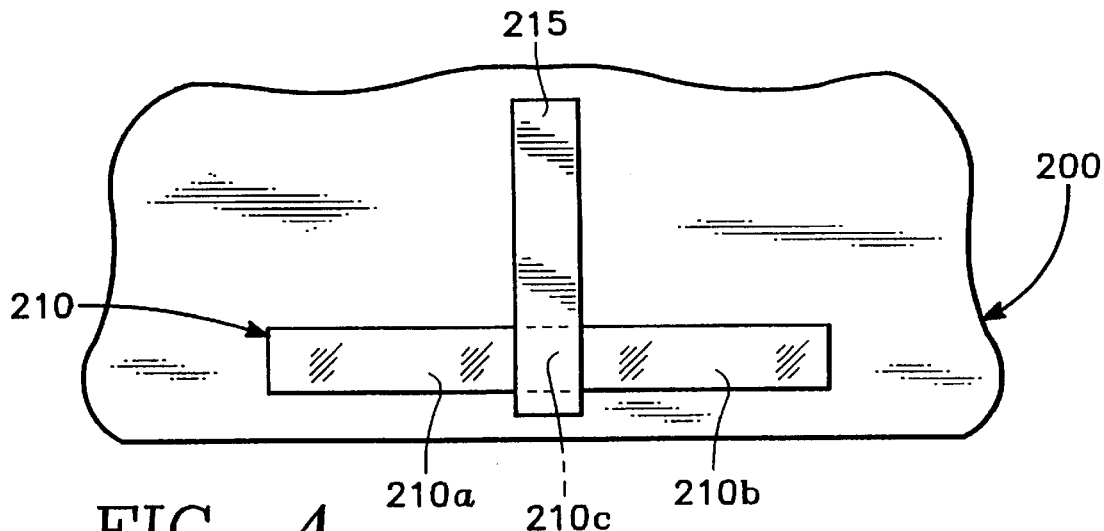
FIG. 4 depicts a thin second strip of exposed resist intersecting and partially covering the magneto-resistive layer strip.

Turning to FIG. 4, after the magneto-resistive strip 210 has been formed, a second photoresist layer, not shown, is deposited over the magneto-resistive strip 210 and over the substrate 200. The second photoresist layer is exposed using a mask or reticle so as to define a second thin stripe perpendicular to the magneto-resistive strip 210.

The unexposed portion of the photoresist is removed so that a second thin photoresist strip 215 covers a portion 210c of the magneto-resistive strip 210. Uncovered portions 210a and 210b of the magneto-resistive strip 210 are removed by ion milling or by RIE etching or by some other technique, as depicted in FIG. 5.

Figure 5:
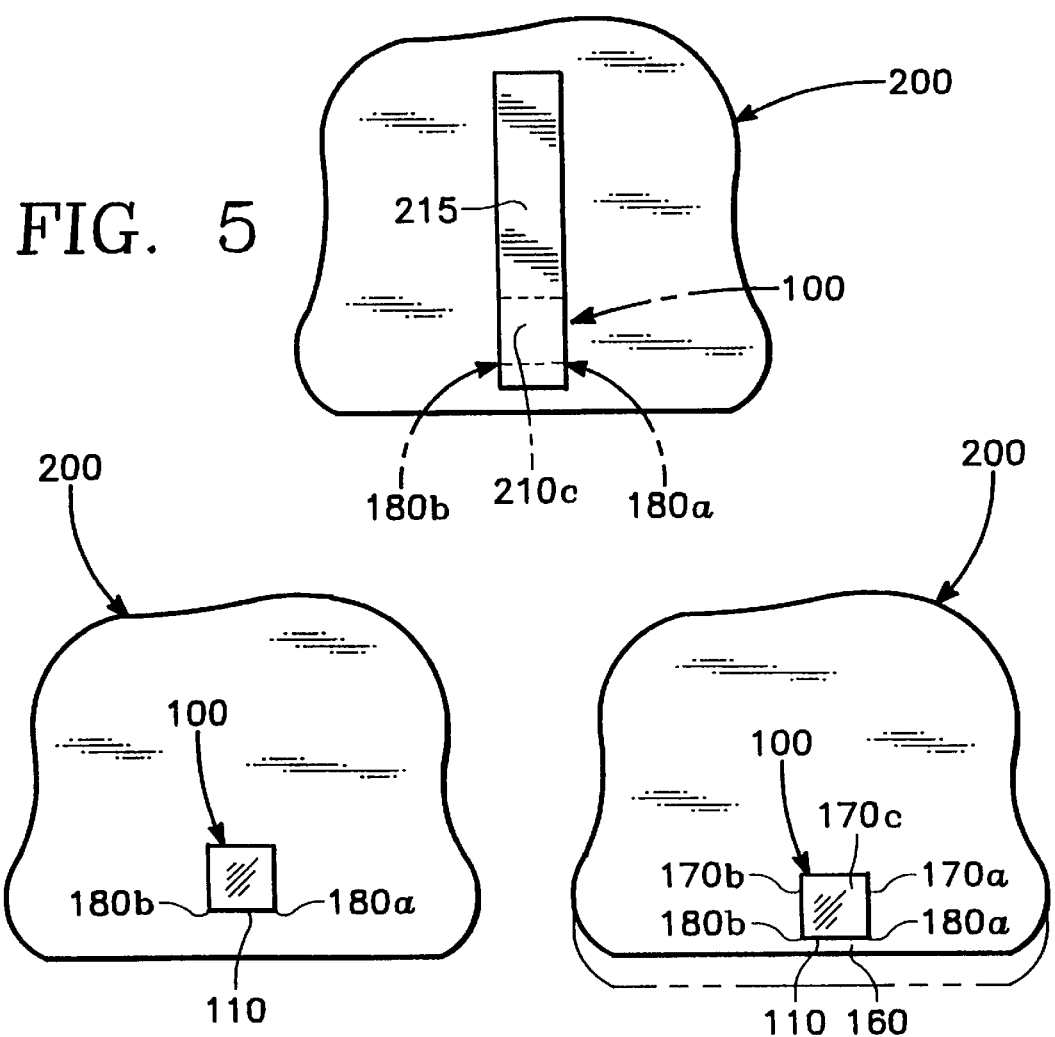
FIG. 5 depicts the thin second strip of exposed resist after removal of the uncovered portion of the magneto-resistive layers.

FIG. 5 shows the magneto-resistive element 100 that remains after removal of the uncovered portions 210a and 210b. The covered portion 210c prevents removal of that portion, thereby forming the element 100 having planar sides 170a and 170b and forming well defined oblique corners 180a and 180b.

Figure 6:
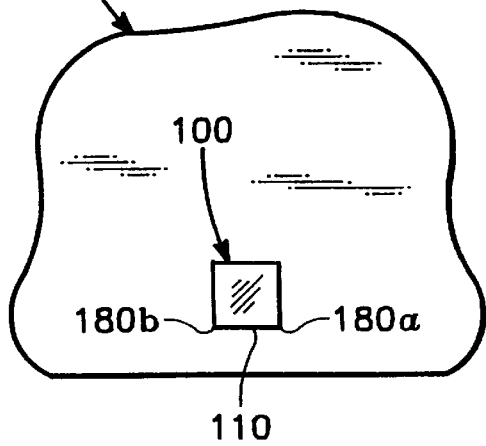
FIG. 6 depicts the element or magneto-resistive read head element of the present invention after removal of the exposed resist.

Turning to FIG. 6, the second photoresist strip 215, shown in FIG. 5, is removed to expose magneto-resistive read head 100. A dielectric material such as $Al_2O_3$, not shown, may then be deposited adjacent the read head 100, and in particular, adjacent the sensing surface 110. Other structures, such as shields, not shown, may also be formed adjacent the magneto-resistive head 100 using the method thus described or by conventional techniques.

Figure 7:
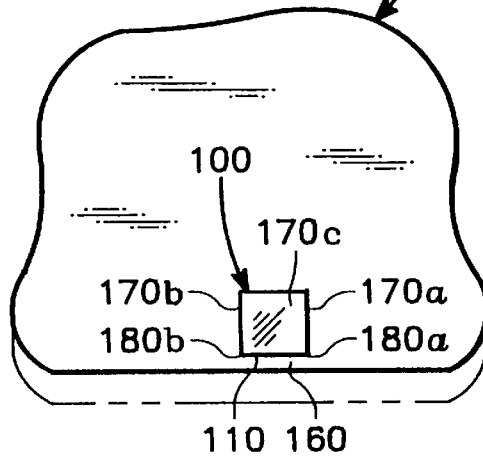
FIG. 7 depicts the recessed element and a deposited protection layer that remains after the lapping or grinding close to but not into the recessed element to form an air bearing surface.

Turning to FIG. 7, after all the desired structures have been formed, the substrate 200 and any layers thereover, such as $Al_2O_3$, may be cut, or it may be lapped or grinded, up to the sensing surface 110. It is presently preferred to lap or grind up to the sensing surface so as to leave the protection layer 160.

It is important to note that the present invention also improve, the lapping process. For small structures, the depth of the lap is typically determined by sensing changes of an applied, or an induced, field, in either the lapped structure, or in a nearby reference element. The sensed change is used to control the depth of the lap.

When lapping into a planar surface with squared corners rather than a rounded surface, the change in the magnetic state is more easily observable as the grinder begins to enter the planar surface. Additionally, it is easier to sense changes in the reference element when its surface is planar. Thus, the present invention improves lapping precision when the lapping or grinding stops short of the element and when lapping or grinding into the elements. As such, the protection layer 160 may be lapped with greater precision when the sensing surface 110 is planar.

Referring to FIG. 4, although it is presently preferred to form the second thin photoresist strip 215 orthogonal to the magneto-resistive strip 210, the second thin stripe 215 may be formed other than a perpendicular to the magneto-resistive strip 210. For example, other rhomboidal structures could be formed by orienting the second photoresist stripe at a non-orthogonal angle with the magneto-resistive strip 210. Furthermore, in another embodiment of the present invention, additional steps may be used to form a third or more photoresist stripes to further define the shape of the magneto-resistive element. For example, a second and third photoresist stripes may be used to form the read element 100 into a triangular or a trapezoidal shape. In addition, in another embodiment of the present invention, the element. 100 may be formed having a curved surface opposite the planar surface 110 if desired by utilizing the end of the intersection stripe to form the surface opposite the planar surface 110.

The present invention is intended to be used to produce any element, such as a read element, a shield element, or other thin film head structure or element with greater precision. Although the foregoing description of the present invention was set forth with respect to a magneto-resistive read head, the present invention and its teachings, are not limited to a magneto-resistive element but are also intended to be applied to other thin film head structures or elements.

In addition, although the foregoing was discussed in terms of conventional photolithographic processes, it is in no way limited to conventional processes, but instead is designed to improve other mask or reticle employing techniques as well. For example, photon sensitive resist may be replaced with some other type resist or radiation sensitive film when employing an other type of radiation source. The present invention is intended to improve other lithographic processes, such as for example, X-ray lithography and E-beam lithography.

Furthermore, although the presently preferred embodiments of the invention are described above, alternate embodiments may be formed that fall within the scope of the present invention. The true scope and breadth of the invention, therefore, is limited only by what is claimed.

What is claimed is:

1. A method for forming a thin film device comprising:
    a) forming a layer of a first material over a substrate;
    b) depositing a first resist layer over the first layer;
    c) exposing the first resist layer so as to define a first thin stripe;
    d) removing a portion of the first resist layer so as to leave a first thin strip of resist covering a portion of the first material layer;
    e) removing the uncovered portion of the first material layer so as to leave a first material strip;
    f) depositing a second resist layer over the first material strip;
    g) exposing the second resist layer so as to define a second thin stripe intersecting the first material strip;
    h) forming from the exposed second resist layer a second thin strip of resist traversing an intermediate portion of the first material strip; and
    i) removing portions of the first material strip not covered by the second strip of resist so as to define from the first material strip a small first material element having substantially square corners.

2. The method for forming a thin film device of claim 1 further comprising depositing a protection layer and removing a portion of the substrate and layers thereover to form an air bearing edge, and wherein the portion of the substrate is removed so that a portion of the protection layer remains between the first material element and the air bearing edge.

3. The method for forming a thin film device of claim 1 wherein the first material element is formed less than 0.25 microns in width.

4. The method for forming a thin film device of claim 1 wherein the first material element is formed less than 0.10 microns in width.

5. The method for forming a thin film device of claim 1 wherein the first material element is formed less than 0.05 microns in width.

6. The method for forming a thin film device of claim 1 wherein the first material element is formed less than 1.0 nanometers in width.

7. The method for forming a thin film device of claim 1 wherein the first material element is formed less than 1.5 Angstroms in width.

8. The method for forming a thin film device of claim 3 further comprising the steps of depositing a protection layer and removing a portion of the substrate and layers thereover to form an air bearing surface, and wherein the portion of the substrate is removed so that a portion of the protection layer remains between the first material element and the air bearing surface.

9. The method for forming a thin film device of claim 3 wherein the first and second resist layers are exposed using visible light.

10. The method for forming a thin film device of claim 9 wherein the first material element is formed less than 0.10 microns in width.

11. The method for forming a thin film device of claim 9 wherein the first material element is formed less than 0.05 microns in width.

12. The method for forming a thin film device of claim 1 wherein the first and second resist layers are exposed using visible light.

13. The method of claim 1 wherein forming the thin film device comprises forming a giant magneto-resistive read head having a spin valve structure and comprising the first material element.

14. The method of claim 1 wherein the thin film device comprises forming a giant magneto-resistive multilayer sensor comprising the first material element.

15. The method of claim 1 wherein forming the thin film device comprises forming one of the group consisting of a tunneling junction sensor, a spin transistor, and a colossal magneto-resistive sensor comprising the first material element.

16. A method for forming a thin film head comprising:
 a) forming a thin film read sensor having a sensing surface from sensor material comprising:
  1) forming an elongated structure of read sensor material using a first elongated resist mask; and
  2) forming the sensing surface from an intermediate portion of the elongated structure of read sensor material by removing an outer portion of the elongated structure of read sensor material using a second elongated resist mask traversing the intermediate portion of the elongated structure of read sensor material.

17. The method for forming a thin film head of claim 16, wherein the read sensor is formed over a substrate, and further comprising depositing a read head protection layer over the substrate, and removing a portion of the substrate and layers thereover to form an air bearing edge, and wherein the portion of the substrate is removed so that a portion of the read head protection layer remains between the sensing surface and the air bearing edge.

18. The method for forming a thin film head of claim 16 wherein the sensing surface is formed less than 0.10 microns in width.

19. The method for forming a thin film head of claim 16 wherein the sensing surface is formed less than 0.05 microns in width.

20. The method for forming a thin film head of claim 16 wherein the sensing surface is formed less than 1.0 nanometers in width.

21. The method for forming a thin film head of claim 16 wherein the sensing surface is formed less than 1.5 Angstroms in width.

22. The method for forming a thin film head of claim 16 wherein the sensing surface is formed using visible light.

23. The method of claim 16 wherein forming the read sensor comprises:
 a) forming the elongated structure of sensor material having elongated generally planar side walls by forming the first elongated resist mask strip over sensor material and removing sensor material so as to define the elongated structure of sensor material;
 b) forming the second elongated resist mask traversing the intermediate portion of the elongated structure of sensor material so as to traverse the elongated generally planar side walls; and
 c) removing portions of the elongated structure of sensor material not under the elongated resist mask so as to define the sensing surface from the intermediate portion with a generally planar sensing surface bounded by remaining portions of the elongated side walls.

24. The method for forming a thin film head of claim 23 wherein the sensing surface is formed less than 0.25 microns in width.

25. The method for forming a thin film head of claim 24 wherein the read sensor is formed over a substrate, and further comprising depositing a read head protection layer and removing a portion of the substrate and layers thereover to form an air bearing edge, and wherein the portion of the substrate is removed so that a portion of the read head protection layer remains between the sensing surface and the air bearing edge.

26. The method for forming a thin film head of claim 24 wherein the sensing surface is formed using visible light.

27. The method for forming a thin film of claim 26 wherein the sensing surface is formed less than 0.10 microns in width.

28. The method for forming a thin film head of claim 26 wherein the sensing surface is formed less than 0.05 microns in width.

29. The method of claim 16 wherein forming the thin film head comprises forming the sensing surface of the read sensor recessed from an air bearing surface.

30. The method of claim 16 wherein forming the read sensor comprises forming a giant magneto-resistive sensor having a spin valve structure.

31. The method of claim 16 wherein forming the read sensor comprises forming a giant magneto-resistive multilayer sensor.

32. The method of claim 16 wherein forming the read sensor comprises forming one of the group consisting of a tunneling junction sensor, a spin transistor, and a colossal magneto-resistive sensor.

33. A method for forming a thin film read head comprising the steps of:
   a) forming a magneto-resistive material over a substrate;
   b) depositing a first resist layer over the magneto-resistive material;
   c) exposing the first resist layer so as to define a first thin stripe;
   d) removing a portion of the first resist layer so as to leave a first thin strip of resist covering a portion of the magneto-resistive material;
   e) removing the uncovered portion of the magneto-resistive material so as to leave a magneto-resistive strip;
   f) depositing a second resist layer over the magneto-resistive strip;
   g) exposing the second resist layer so as to define a second thin stripe perpendicular to the magneto-resistive strip;
   h) forming from the exposed second resist layer a second thin strip of resist traversing an intermediate portion of the magneto-resistive strip; and
   i) removing portions of the magneto-resistive strip not covered by the second thin strip of resist so as to define from the magneto-resistive strip a small squared magneto-resistive element.

34. The method for forming a thin film read head of claim 33 further comprising the steps of depositing a read head protection layer over the substrate, and removing a portion of the substrate and layers thereover to form an air bearing edge, and wherein the portion of the substrate is removed so that a portion of the read head protection layer remains between the magneto-resistive element and the air bearing edge.

35. The method for forming a thin film read head of claim 33 wherein the small magneto-resistive element is formed less than 0.25 microns in width.

36. The method for forming a thin film read head of claim 33 herein the small magneto-resistive element is formed less than 0.10 microns in width.

37. The method for forming a thin film read head of claim 33 wherein the small magneto-resistive element is formed less than 0.05 microns in width.

38. The method for forming a thin film read head of claim 33 wherein the small magneto-resistive element is formed less than 1.0 nanometers in width.

39. The method for forming a thin film read head of claim 33 wherein the small magneto-resistive element is formed less than 1.5 Angstroms in width.

40. The method for forming a thin film read head of claim 35 further comprising the steps of depositing a read head protection layer and removing a portion of the substrate and layers thereover to form an air bearing edge, and wherein the portion of the substrate is removed so that a portion of the read head protection layer remains between the magneto-resistive element and the air bearing edge.

41. The method for forming a thin film read head of claim 35 wherein the first and second resist layers are exposed using visible light.

42. The method for forming a thin film read head of claim 41 wherein the small magneto-resistive element is formed less than 0.10 microns in width.

43. The method for forming a thin film read head of claim 41 wherein the small magneto-resistive element is formed less than 0.05 microns in width.

44. The method for forming a thin film read head of claim 33 wherein the first and second resist layers are exposed using is visible light.

45. The method of claim 33 wherein forming the thin film head comprises lapping to form an air bearing surface without lapping into the magneto-resistive element.

46. The method of claim 33 wherein forming the magneto-resistive element comprises forming a giant magneto-resistive sensor having a spin valve structure.

47. The method of claim 33 wherein forming the magneto-resistive element comprises forming a giant magneto-resistive multilayer sensor.

48. The method of claim 33 wherein forming the magneto-resistive element comprises forming one of the group consisting of a tunneling junction sensor, a spin transistor, and a colossal magneto-resistive sensor.

* * * * *

UNITED STATES PATENT AND TRADEMARK OFFICE
CERTIFICATE OF CORRECTION

PATENT NO.    : 6,178,066 B1
DATED         : January 23, 2001
INVENTOR(S)   : Ronald A. Barr It is certified that error appears in the above-identified patent and that said Letters Patent is hereby corrected as shown below:

<u>Title page,</u>
References Cited: In the first reference listed, replace "4,172,758 10/1979 Jones et al." with -- 4,172,758 10/1979 Bailey et al. --
In the second reference listed, replace "4,464,459 8/1984 Hajima et al." with -- 4,464,459 8/1984 Majima et al. --
In the fifth reference listed, replace "4,841,624 6/1989 Togawa" with -- 4,841,624 6/1989 Togawa et al. --
In the tenth reference listed, replace "5,381,291 1/1995 Madden et al." with -- 5,381,291 1/1995 Madsen et al. --
In the reference cited, replace "5,640,734 6/1997 Lazzari et al." with -- 5,640,754 6/1997 Lazzari et al. --

<u>Column 2,</u>
Line 20, replace "allows (conventional" with -- allows conventional --

<u>Column 5,</u>
Line 58, replace "improve, the" with -- improves the --

Signed and Sealed this

Eighteenth Day of June, 2002

*Attest:*

JAMES E. ROGAN
*Attesting Officer*   *Director of the United States Patent and Trademark Office*